Patented Feb. 27, 1934

1,949,046

UNITED STATES PATENT OFFICE 1,949,046

BASIC ETHER CONTAINING HALOGEN

Max Hartmann and Hans Isler, Riehen, near Basel, Switzerland, assignors to the firm of Society of Chemical Industry in Basle, Basel, Switzerland No Drawing. Original application March 24, 1930, Serial No. 438,638. Divided and this application February 27, 1932. Serial No. 559,651. In Switzerland April 5, 1929

1 Claim. (Cl. 260—127)

This is a division of our application for Patent Serial No. 438,638, filed in the United States on March 24, 1930 and in Switzerland on April 5, 1929.

The present invention relates to new basic ethers containing halogen useful in therapeutics. It is based on the observation that by the introduction of one or more halogen atoms into basic ethers of compounds of the aromatic series and of the quinoline series—which compounds have no appreciable antiseptic action—there are obtained products which are valuable antiseptics.

The new products may be made by causing, advantageously in presence of an acid binding agent, (a) a reactive ester of an amino-alcohol to react with a compound of the aromatic series or of the quinoline series, containing halogen and a nuclear hydroxyl group, or with a substitution product of such a compound, or (b) an amino alcohol to react with a polyhalogen compound of the aromatic series or of the quinoline series, or with a substitution product thereof, in such a manner that at least one halogen atom remains in the product.

The new basic ethers may also be obtained by causing amines to react with compounds of the aromatic or quinoline series containing halogen-alkoxy-groups and halogen in the nucleus.

Another method of making the new compounds consists in introducing one or more halogen atoms into a basic ether of the aromatic series or of the quinoline series, which is free from halogen, for instance by direct halogenation by means of halogen or an agent yielding halogen, or by replacing an amino-group in the basic ether by halogen. Yet another method of making the new products consists in converting a basic ether of an aromatic compound containing halogen, by a suitable ring closure, into the basic ether of a quinoline compound containing halogen, for example by condensation of a halogenated basic ether of an aromatic compound with glycerine.

The new bases yield salts by combination with one equivalent, or in the case of bases of the quinoline series, also with two equivalents of an acid. By reason of the fact that these salts are soluble in water, the new compounds have a very wide sphere of application; for example, aqueous solutions of the salts formed by combination with one equivalent of an acid are especially suitable, on account of their neutral reaction, for internal application, for instance for injection. In contrast with the new basic ethers the corresponding halogenated phenols of the aromatic series and of the quinoline series, such as chlorothymol, chloro-iodo-oxyquinoline or the like, are practically insoluble in water.

The new products are applicable for therapeutic purposes.

The following examples illustrate the invention, the parts being by weight:

Example 1

1 part of chloro-thymol, 1.2 parts of chlorethyldiethylamine-hydrochloride and 3 parts of potassium carbonate are mixed with acetone and the mixture is heated to boiling whilst stirring. When the reaction is complete the inorganic matter is separated by filtration; the filtrate is distilled to remove acetone and the residue is taken up in benzene and treated several times with a dilute solution of caustic soda. The solvent is then expelled and the product distilled under reduced pressure, whereby there is obtained 1 - diethylamino - ethoxy - 2-isopropyl-4-chloro-5-methylbenzene of boiling point 142–143° C. under a pressure of 3 mm. The product is a faintly yellow oil; its hydrochloride is a colorless powder, which is easily soluble in water.

The same product may be obtained by causing diethylamine to react with 1-bromoethoxy-2-isopropyl-4-chloro-5-methylbenzene. The 1-bromoethoxy-2-isopropyl-4-chloro - 5 - methylbenzene, (yellow oil of boiling point 154–155° C. under a pressure of 6 mm), is prepared from chlorothymol and ethylene-bromide.

Example 2

3 parts of tribromophenol, 3 parts of chloroethyldiethylamine hydrochloride, 1 part of sodium hydroxide and 60 parts of water are heated at 50–60° C. for several hours, whilst stirring. The reaction mixture is then allowed to cool and the product is extracted by means of benzene. The benzene extract is distilled to remove the solvent and the residue is distilled under reduced pressure. There is thus obtained 2.4.6-tribromo-1-diethylaminoethoxybenzene, a yellow oil boiling at 170–171° C. under a pressure of 3 mm. Its hydrochloride is a crystalline powder of melting point 163–164° C. and is readily soluble in water.

*Example 3*

To a solution in glacial acetic acid of 1 part of diethylaminoethoxynaphthalene (a bright yellow oil forming a hydrochloride of melting point 159–161° C. and obtainable from α-naphthol by a process analogous to that described in Example 1) there is added gradually 1.3 part of bromine. There separates an orange crystalline perbromide which is converted by boiling in the presence of a small quantity of acetone into 1-diethylaminoethoxy - 4 - bromonaphthalene - hydrobromide of melting point 174–175° C. The free base forms a yellowish oil; its hydrochloride is a colorless crystalline powder which is easily soluble in water and melts at 179–180° C.

*Example 4*

A mixture of 1 part of 2-amino-4-chlorophenol, 1.5 part of chloroethyldiethylamine hydrochloride, 5 parts of potassium carbonate and 30 parts of acetone is heated to boiling for several hours in a reflux apparatus; the reaction mixture is worked up in the manner described in Example 1. There is thus obtained 1-diethylaminoethoxy-2-amino-4-chlorobenzene, a faintly yellow, mobile oil, of boiling point 158–160° C. under a pressure of 3 mm.

*Example 5*

To a solution of 1 part of sodium in 200 parts of absolute alcohol are added 4 parts of 5-chloro-7-iodo-8-hydroxyquinoline and 4 parts of chlorethyldiethylamine-hydrochloride. The whole is heated for some time, separated from inorganic matter by filtration and the filtrate is distilled under reduced pressure to remove alcohol. The residue is taken up in benzene, the benzene solution is extracted several times by means of dilute caustic soda solution and the benzene is finally distilled. There is thus obtained 5-chloro-7-iodo-8-diethylamino-ethoxy-quinoline, a yellow viscous oil which forms salts by combination with one equivalent or with two equivalents of acid. The salts of both types are in general easily soluble in water, salts of the former type yielding neutral solutions and salts of the latter type yielding solutions having an acid reaction. The mono-hydrochloride forms almost colorless crystals of melting point 187–188° C., and the dihydrochloride a yellow crystalline powder of melting point 153–154° C.

*Example 6*

A mixture of 4 parts of 5:6:7-trichloro-hydroxyquinoline, 5 parts of chloroethyldiethylamine-hydrochloride, 10 parts of potassium carbonate and 200 parts of acetone are heated to boiling for several hours, whereupon the reaction mixture is worked up in the manner described in Example 1. There is obtained 5:6:7-trichloro-8-diethylaminoethoxyquinoline; the product is a practically colorless oil and forms a colorless crystalline dihydrochloride of melting point 134–135° C.

*Example 7*

22 parts of 2:7-dichloro-4-methylquinoline are introduced into a solution of 3 parts of sodium in 100 parts of diethylaminoethanol and the whole is heated for some time at 140–145° C. on an oil bath. Sodium chloride is then removed by filtration and the excess of diethylaminoethanol is removed from the filtrate by distillation. There remains a yellow oil consisting of 2-diethylaminoethoxy - 4 - methyl - 7 - chloroquinoline. It forms a dihydrochloride of melting point 154–155° C. and a methanesulfonate melting at 133–135° C.; both salts are colorless crystalline powders and are easily soluble in water.

2:7-dichloro-4-methylquinoline may be made in the following manner: Aceto-acetic-ester is condensed with meta-chloraniline and the meta-chloro-aceto-acetic-anilide of melting point 103–104° C. thus produced is heated for some time with concentrated sulfuric acid, whereby ring closure occurs with the elimination of water, and 2-hydroxy - 4 - methyl - 7 - chloro-quinoline (melting point 271–272° C.) is formed. By heating the latter compound with phosphorus oxychloride it is converted into 2:7-dichloro-4-methylquinoline of melting point 97–98° C.

*Example 8*

A mixture of 2 parts of 1-diethylaminoethoxy-2 - amino-4-chlorobenzene (obtainable as described in Example 4), 1.5 part of arsenic acid, 5 parts of glycerine and 4 parts of sulfuric acid of 56° Bé is heated for some time at a temperature of 160–165° C. The reaction mixture is then poured into water; the whole is made alkaline and then extracted by means of benzene. After distilling the extract to remove the benzene the residue is distilled fractionally under reduced pressure, 5-chloro-8-diethylaminoethoxyquinoline distilling at 165–169° C. under a pressure of 0.6 mm. The product is a yellowish oil and forms a hydrochloride constituting a lemon-yellow crystalline powder which is easily soluble in water and melts at 191–193° C.

In a similar manner there may be obtained in accordance with the invention the following compounds:

| | Salt | Melting point |
|---|---|---|
| 1-dicyclohexylamino-ethoxy-4-chlorobenzene. | Hydrochloride | 198–199° C. |
| 5 - bromo - 8 -diethylamino - ethoxy - quinoline. | Dihydrochloride. | 158–159° C. |
| 5 - chloro - 8 - dicyclohexyl - amino - ethoxy-quinoline. | do | 239–240° C. |
| 5 - chloro - 7 - bromo - 8 - diethyl - aminoethoxy-quinoline. | do | 142–143° C. |
| 5:7 - dibromo - 8 - diethylamino - ethoxy-quinoline. | do | 165–166° C. |
| 5 - bromo - 7 - iodo - 8 - diethylamino - ethoxy-quinoline. | do | 142–143° C. |
| 5:7 - di - iodo - 8 - diethylamino - ethoxy-quinoline. | do | 168–169° C. |
| 4 - methyl - 7 - chloro - 8 - piperidino - ethoxy-quinoline. | do | 150–151° C. |

In the same way there may further be obtained the corresponding aminopropyloxy, aminobutyloxy-, aminoamyloxy- etc. derivatives.

The compounds serving as parent materials for the manufacture of certain of the bases described in the foregoing table may be made in the following manner:—

5-chloro-7-bromo-8-hydroxyquinoline (melting point 177–179° C.) by bromination of 5-chloro-8-hydroxyquinoline in glacial acetic acid;

5-bromo-7-iodo-8-hydroxyquinoline (melting point 182–184° C.) by introducing iodine into 5-bromo-8-hydroxquinoline;

5:7-di-iodo-8-hydroxyquinoline (small yellow leaves of melting point 209–210° C.) by introducing iodine into 8-hydroxyquinoline.

Chloromethyldicyclohexylamine hydrochloride (a colorless crystalline powder of melting point 186° C.) by heating dicyclohexylaminoethanol with thionyl chloride. Dicyclohexylaminoethanol (boiling point 135° C. under a pressure of 2 mm.) can be obtained by reaction between dicyclohexylamine and glycol chlorhydrin.

What we claim is:—

The diethylaminoethoxy-bromonaphthalene of the formula

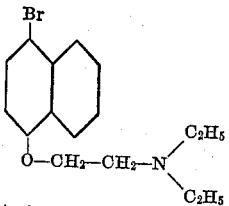

which product is a yellowish oil forming with hydrochloric acid a salt of melting point 179–180° C. soluble in water, said product being useful in therapeutics as an antiseptic.

MAX HARTMANN.
HANS ISLER.